Jan. 11, 1955     E. E. SHELDON     2,699,512
CAMERA FOR INVISIBLE RADIATION IMAGES
Filed Nov. 21, 1951     2 Sheets-Sheet 1
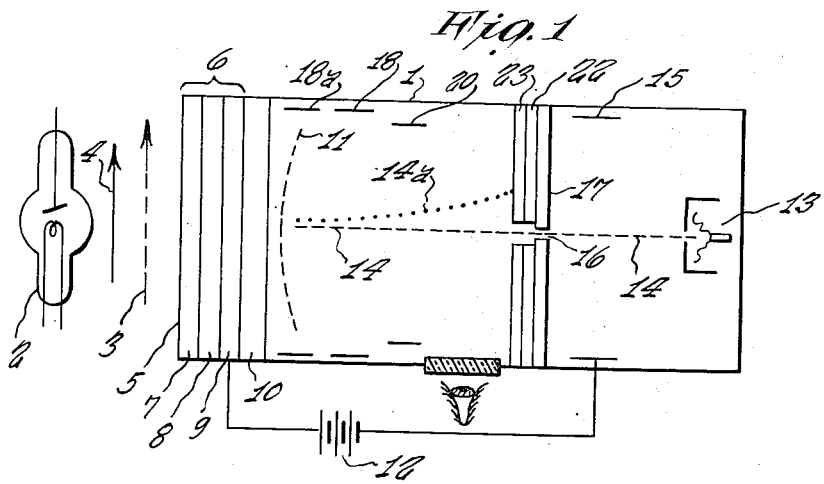
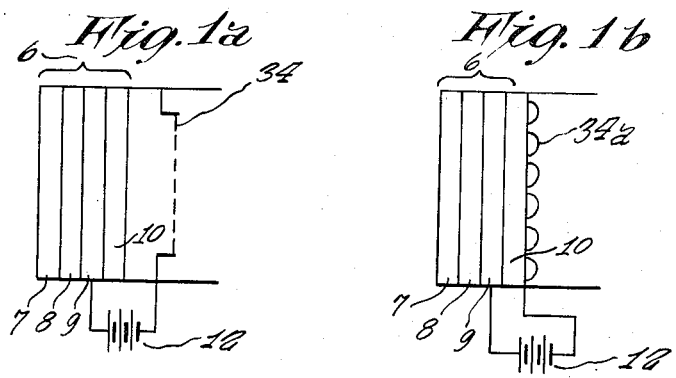 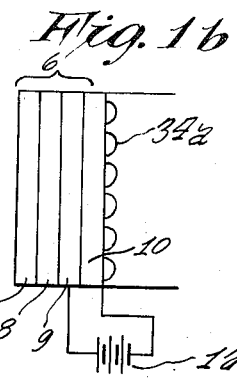
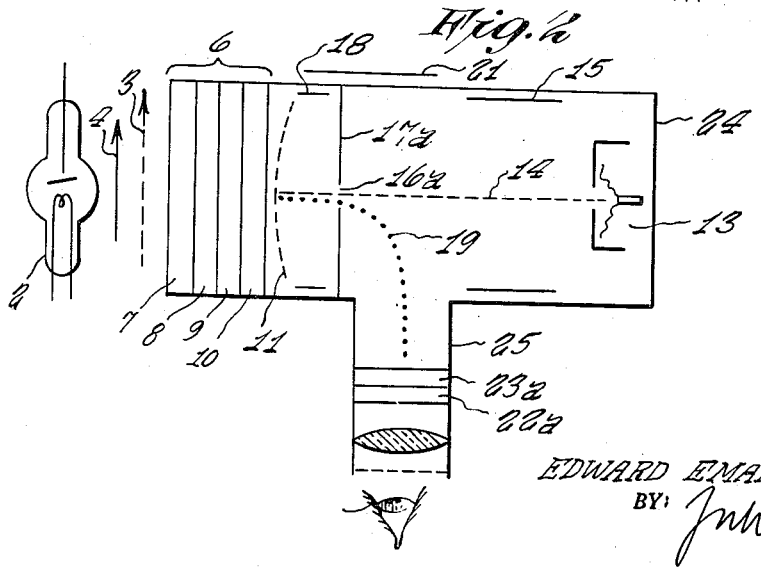
INVENTOR.
EDWARD EMANUEL SHELDON
BY:
HIS ATTORNEY Jan. 11, 1955   E. E. SHELDON   2,699,512
CAMERA FOR INVISIBLE RADIATION IMAGES
Filed Nov. 21, 1951   2 Sheets-Sheet 2
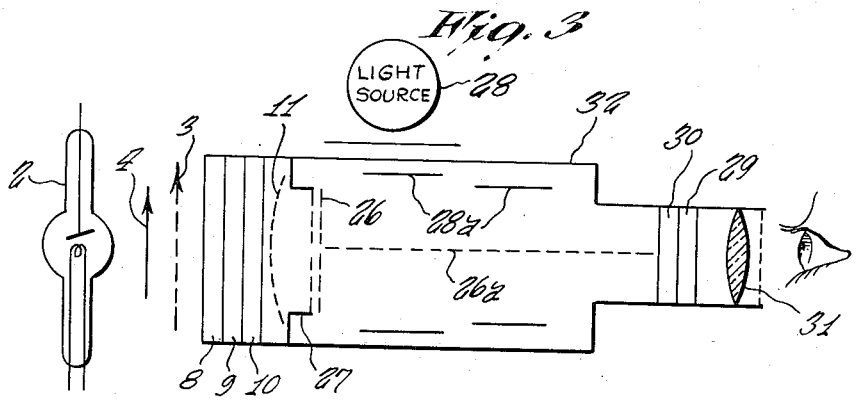
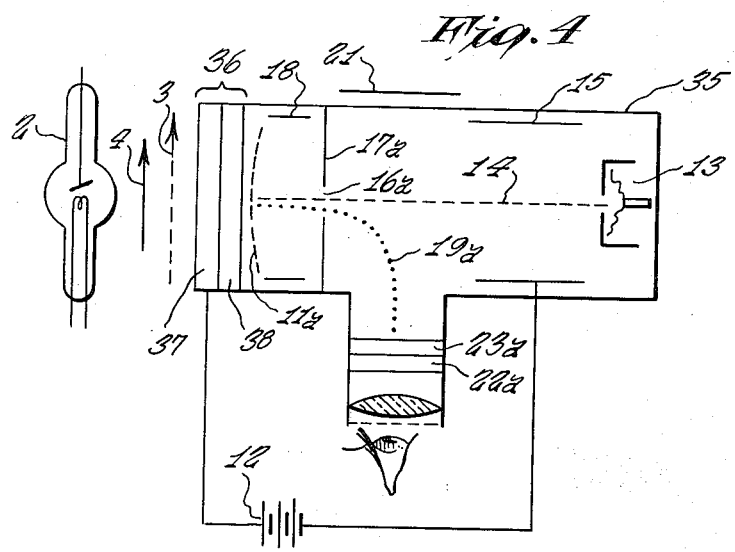
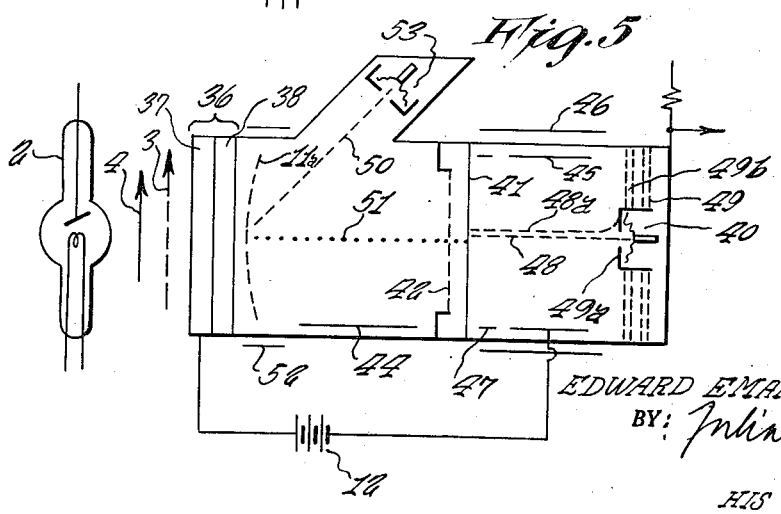
INVENTOR.
EDWARD EMANUEL SHELDON
BY: Julian J. Wittal
HIS ATTORNEY

United States Patent Office 2,699,512
Patented Jan. 11, 1955

2,699,512

CAMERA FOR INVISIBLE RADIATION IMAGES

Edward Emanuel Sheldon, New York, N. Y.

Application November 21, 1951, Serial No. 257,550

4 Claims. (Cl. 313—65)

This invention relates to an improved method and device of intensifying images and refers more particularly to an improved method and device for intensifying images formed by the impingement of an invisible radiation, which term is meant to include X-rays, gamma rays and the like, and also irradiation by beams of atom particles, such as neutrons, and is for the same subject matter as my U. S. Patent No. 2,555,423.

The main problem in using X-rays or neutrons for medical diagnosis is the danger of causing damage to the patient by radiation. The danger of over-exposure necessitates the use of a very weak X-ray or neutron beam, which means that the X-ray intensity must be very low and we have, therefore, only a small number of X-ray quanta in the invisible image of the human body. If we do not use all of available X-ray quanta, we will not be able to reproduce an image having all the necessary intelligence, no matter how much we will subsequently intensify this image by electronic means. The solution of this problem is to provide an invisible radiation receptor, which will utilize all incoming photons of radiation, which means it will have quantum efficiency close to unity. The present X-ray receivers of photoemissive type have a very low quantum efficiency, such as of the order of a fraction of 1% and, therefore, suffer from a basic limitation, as explained above.

Another object of this invention is to provide a method and device to produce intensified images. This intensification will enable the overcoming of the inefficiency of the present fluoroscopic examinations. At the present level of illumination of the fluoroscopic image, the human eye has to rely exclusively on scotopic (dark adaptation) vision, which is characterized by a tremendous loss of normal visual acuity in reference both to detail and to the contrast.

In order to obtain improvement in the visual acuity, intensification of the brightness of the order of 1000 is obligatory. Without intensification of luminosity of at least of the order of 1000, the eye is confined to so-called scotopic vision, at which it is not able to perceive definition and contrast of the fluoroscopic image. It is well known that intensification of the brightness of the fluoroscopic image cannot be achieved by increase of energy of the X-ray or neutron radiation, as it will result in damage to the patient's tissues.

Another object of this invention is the storage of X-ray or neutron images to make it possible to prolong the fluoroscopic examination since this invention will allow the reduction of the total amount of radiation affecting the patient's body. Conversely, the exposure time or energy necessary for the radiography may be reduced.

The objectives of this invention were obtained by a novel invisible radiation sensitive image tube. This tube has X-ray or neutron sensitive composite screen, which consists of a fluorescent layer, a conducting layer and a photoconductive layer. The photoconductive layer is a dielectric, which becomes electrically conductive when irradiated by light. The invisible X-ray or neutron image produces, therefore, in the invisible radiation sensitive screen a fluorescent light image. The fluorescent light acts on a photoconductive layer and creates therein a pattern of electrical conductivity changes, as well as a pattern of electrical potentials on the surface of said conductive layer. The latter process has a high quantum efficiency such as approaching unity. The electrical conductivity changes and the electrical potentials on the surface of the conductive layer have the pattern of the X-ray or neutron image. They cannot, however, be used directly for reproduction of a visible image with the necessary intensification. They are used in my invention to modulate a strong uncontrolled electron beam. The modulated electron beam will have, therefore, the pattern of the original X-ray or neutron image. This electron beam when returning, can be accelerated, electron-optically diminished and projected onto a fluorescent screen in the image tube to reproduce a visible image with necessary intensification, as was explained in my U. S. Patent No. 2,555,423.

In another modification of my invention, the novel invisible radiation sensitive image tube has X-ray or neutron receiving screen only of a dielectric material, which exhibits property of becoming conductive directly in response to X-ray or neutron beam. The invisible X-ray or neutron image produces within said invisible radiation sensitive screen a pattern of electrical conductivity changes and on the surface of said screen a pattern of electrical potentials with a high quantum efficiency, such as approaching unity. The electrical conductivity changes and potentials have the pattern of the X-ray or neutron image. They cannot, however, be used directly for reproduction of a visible image with the necessary intensification. They are used in my present invention to modulate a strong uncontrolled electron beam, as it will be explained in detail below.

The invention will be better understood when taken in connection with the accompanying drawings.

In the drawings:

Figure 1 represents a novel invisible radiation sensitive image tube.

Figure 1a and 1b represent modifications of invisible radiation sensitive photocathode.

Figure 2 represents a modification of invisible radiation sensitive image tube adapted for straight viewing.

Figure 3 represents a modification of an invisible radiation sensitive image tube.

Figure 4 represents a simplified embodiment of invisible radiation sensitive image tube.

Figure 5 represents an invisible radiation image sensitive pick-up tube.

Reference will now be made to Fig. 1, which illustrates the novel X-ray or neutron sensitive image tube 1. The X-ray source 2 produces an invisible image 3 of the examined body 4. The invisible image passes through the face 5 of the tube, which obviously must be of material transparent to the radiation used and may be flat or convex in shape and strikes the composite photocathode 6 disposed inside of the image tube. The composite photocathode 6 consists of an invisible radiation transparent, light reflecting layer 7, of a fluorescent layer 8 sensitive to said invisible radiation, of a very thin conducting layer 9 and of a photoconductive layer 10. The layer 7 may be of aluminum, gold, silver or platinum and must be very thin in order not to absorb the invisible image. The layer 8 may be made of various sulphides, selenides, silicates, organic phosphors, such as stilbene, anthracene, of tungstates, ZnO or $BaPbSO_4$.

For neutron images, the fluorescent layer should be activated with elements which have a large cross-section for neutrons, such as boron, lithium, gadolinium or an additional neutron sensitive layer, such as of boron, lithium or gadolinium, should be disposed adjacent to fluorescent layer.

The conducting layer 9 must be transparent to fluorescent light and must be exceedingly thin in order not to impair resolution of the image. I found out that the maximum thickness of the conducting layer, which separates fluorescent and photoconductive layers must be less than 0.25 millimeter in order to reproduce an image of diagnostic value. The conducting layer may be of gold, silver, platinum, silicates, or may be of material, such as plastic, glass or mica, coated with the conductive layer, such as known under the trade name "Nesa" and manufactured by Pittsburgh Glass Company. The photoconductive layer 10 may be of CdS, $Sb_2$—$S_3$, selenium or ZnSe. Many sulphides, selenides, iodides, arsenides and oxides exhibit photoconductive effect and may be used for the purposes of my invention. The invisible X-ray or neutron image produces in the fluorescent layer 8 a fluorescent light image having the pattern of said invisible image. The fluorescent image produces within the photoconductive layer a pattern of changes in electrical conductivity and on the surface of said photoconductive layer a pattern of potentials according to the pattern of said fluorescent light image. The photoconductive layer 10 is under the influence of an electrical field produced by an extrinsic source of electrical power, such as battery 12, which is connected to the conducting layer 9. Under the influence of this electrical field, the electrons and positive holes liberated in the photoconductive layer by the impingement of fluorescent light from the layer 8, and in some cases also of the X-ray or neutron image, move to respective electrodes. Therefore, the pattern of potentials having the pattern of the original X-ray or neutron image appears on the uncovered surface of the photoconductive layer 10. In some cases, better results are obtained by using a pulstating electrical field instead of a battery. In particular, applying a square wave voltage of a low frequency, such as 15–30 cycles per second to the conducting layer 9 will markedly improve the sensitivity of the photocathode and will prevent "fatigue" effects.

The uncovered surface of layer 10 is irradiated by a broad beam 14 of electrons from the electron gun 13. The broad electron beam is focused by magnetic or electrostatic fields 15 to a small diameter, so that it will pass through the aperture 16 in the light transparent diaphragm 17, such as of mica or glass. The electron beam 14, after passage through aperture 16, is enlarged by suitable magnetic or electrostatic fields 18 to the size corresponding to the size of the photocathode. The electron beam 14, when approaching photocathode, may have velocity of a few hundred volts. It is preferable, however, to use a slow electron beam. In such event, the electron beam 14 is decelerated in front of the photocathode by an additional decelerating electrode 18a, which may be in the form of a ring or of a mesh screen. The electron beam approaching the photoconductive layer 10 is modulated by the pattern of potentials on its surface and of conductivity changes within said layer. The electrons of the beam which strike conducting areas of the photoconductive layer 10 reach conducting layer 9 and are led away. The electrons of the electron beam, which find non-conductive parts of the layer 10, cannot pass through. In addition to said modulation of the electron beam 14 by conductivity changes, it is also modulated by the pattern of potentials on the surface of the photoconductive layer 10. The areas of a higher negative potential will reflect electrons more than areas having a lower potential acting as an electron mirror 11. The reverse situation exists if the X-ray induced conductivity is due to positive holes, because in such a case, the areas of higher positive potential will obviously attract electrons instead of repelling them. By proper choice of material for photoconductive layer, these two modulating effects can be made to work in the same direction and improve modulation of the electron beam. The returning electron beam 14a is, therefore, modulated by the photoconductive and potential image in the composite photocathode 6 and carries the image of the examined body. The returning electron image 14a is now intensified by acceleration. This is accomplished by accelerating fields or electrodes 20, which are well known in the art and, therefore, it is believed, that they do not have to be described in detail.

Further intensification of electron image may be obtained by its electron-optical diminution, which results in intensification proportional to the square power of linear decrease in size. The electron-optical demagnification is accomplished by magnetic or electrostatic fields and is well known in the art. The action of the electron beam 14 should last no longer than 1/15–1/30 second to avoid the flicker of reproduced image. After this period, the electron gun 13 is inactivated for a very short time. Instead, the accelerating electrodes 20 and the electron-optical lenses for electron-optical diminution of the returning electron image 14a are activated. The switching system for activating and inactivating electron gun and the electrical fields described above may be operated by thyratron or ignitron controlled timer and is not shown in detail because it is well known in the art and will only complicate the drawings.

The intensified electron image 14a is focused on the fluorescent screen 22, which has electron transparent light reflecting backing 23, such as of aluminum. The impingement of electron beam 14a on fluorescent screen 22 will reproduce the original invisible image as a fluorescent light image with a desired degree of intensification, which was the primary objective of this invention. The fluorescent screen 22 must have a very fine grain to be able to resolve the diminished electron image. ZnO phosphor is suitable for this purpose. Better results will be obtained by evaporated phosphors which have no grain structure and are, therefore, capable of reproducing images of high definition. Such phosphors were described in the article published in the Journal of the Optical Society, August, 1951, page 559. The fluorescent image can be viewed by the observer through the magnifying optical system, which will restore the image to the desired size without impairing its brightness. In some cases, the light reflecting layer may be omitted and image may be viewed from the uncovered side of the fluorescent screen. In such a case, however, photoconductive layer 10 and the fluorescent screen 22 must be so correlated that a wave length of the fluorescent light should not affect the photoconductive layer 10. For example, antimony trisulphide is not sensitive to blue light or selenium may be prepared not to be sensitive to the red light.

I found that modulation of electron beam 14 by the conductivity or the potential image occurs in a very short time, such as a few micro-seconds. It is possible, therefore, to intensify the final fluorescent image in screen 22 by irradiating photocathode 6 with electron beam 14 a few hundred or a few thousand times per second, instead of 15–30 times per second.

A very important feature of my novel X-ray or neutron sensitive image tube is that it can be operated as a storage tube. This means that after the invisible image is formed in the photocathode 6 as a pattern of electrical conductivity changes or of electrical potentials, X-ray or neutron radiation may be shut off and the image may be read for the desired time. This results in a great reduction of X-ray or neutron exposure of patients, which was one of the primary objectives of my invention. The operation of the image tube 1 or 24 as a storage tube is essentially the same as described above, except that X-ray or neutron radiation may be stopped after one short exposure. The storage effect of my image tube is due to photoconductive lag observed in insulators, such as selenium, cadmium, sulphide or antimony trisulphide and others when the incident light is of a low intensity. Such conditions prevail in medical fluoroscopy where the brightness of fluorescent light image produced in layer 8 by X-ray or neutron image is in the range of 0.01–0.001 footcandle. The photoconductive lag means that conductivity pattern within the layer 10 and potential pattern on the uncovered surface of said photoconductive layer persists for many seconds. During all this time, the electron beam 14 can be modulated by said conductivity or potential pattern and will reproduce visible image corresponding to the original X-ray or neutron image in the fluorescent screen 22. The photoconductive lag may be prolonged by refrigerating the photoconductive layer 10 of the photocathode, or by addition of suitable impurities, such as Cu when using CdS for a photoconductive layer.

Another important advantage of the X-ray or neutron sensitive tubes 1 or 24 resides in the efficiency of the photoconductive layer as compared with the previously used photoemissive layer. Whereas the best photoemissive materials have quantum efficiency of the order of 3 to 5%, the photoconductive layer 10 has quantum efficiency close to unity or even exceeding unity.

The efficiency of photoconductive layer 10 can also be increased by providing a strong electrical field across it, which serves to move liberated electrons and positive holes across said layer.

In a modification of my invention shown in Fig. 1a, the potential pattern of the uncovered side of the photoconductive layer 10 is intensified by disposing in close proximity to said uncovered side, a mesh screen 34, which is connected to one terminal of the battery 12; the other terminal of the battery is connected to conducting layer 9. In this way, a strong electrical field is produced across the layer 10. In another modification of my invention shown in Fig. 1b, instead of a mesh screen, a discontinuous mosaic 34a of conducting particles, such as of gold, platinum or silver is deposited on the uncovered side of the photoconductive layer 10 to provide the second terminal for battery 12 for producing a strong electrical field across the layer 10.

The larger the dark resistance of the photoconductive layer, the larger will be the potential pattern on its surface for modulating the electron beam 14. In order to obtain both high photosensitivity and high resistance, photoconductive layer 10 may be made of two adjacent layers, such as one of a photoconductive material highly responsive to fluorescent light from layer 8 and one of having high resistance for storage of charges liberated in the first layer. A suitable combination for such composite photoconductive screen is a thin layer of selenium deposited on the top of a thin layer of cadmium sulphide or of antimony trisulphide, so that selenium remains uncovered on one side for exposure to the electron beam 14.

Great improvement in sensitivity of X-ray or neutron image tube was obtained in modification shown in Fig. 2. In this embodiment of invention, the operation of the tube 24 is characterized by two different periods. In the first period, the build-up of the conductivity and potential image is accomplished. For this purpose the positive potential applied to the conducting layer 9 must be high in order to make all electrons of the electron beam 14 impinge on the photoconductive layer 10. The electron beam 14 in this phase of operation should have a high internal resistance. After the build-up of the invisible conductivity and potential image is concluded, the "reading" period begins. In the "reading" period, the potential applied to the conducting layer 9 is lowered so that the photoconductive layer 10 will not attract any longer electrons of electron beam 14. The electron beam 14 in this phase of operation is modulated by conductivity and potential image formed before in the layer 9, during the build-up period. The returning electron beam 19 carries, therefore, image having the pattern of the original X-ray or neutron image. The returning electron beam 19 passes through the opening 16a in the diaphragm 17a, is bent by suitable magnetic fields 21 and is projected on the fluorescent screen 22a, which has an electron transparent light backing 23a, such as of aluminum. The fluorescent screen 22a is housed in an extension 25 of the tube 24 to provide a straight optical view of the reproduced image, instead of a view at an angle, as shown in Fig. 1. In some cases, the diaphragm 17a may be eliminated. In such event, the fluorescent screen 22a is protected from stray electrons of the electron beam 14, which may be reflected during the build-up period by inactivation of the magnetic field 21. The same can also be accomplished by lowering the potential of the screen 22a, so that stray reflected electrons cannot penetrate through light reflecting layer 23a. Another solution of the problem of viewing the final image in the straight axis instead of at an angle, is to place electron gun 13 in a special compartment, which is at the angle to the axis of the tube. This will make it possible to dispose the fluorescent screen at the end of the image tube opposite to the photocathode, which is at the other end of the tube. Therefore, the final image can be viewed now straight in the axis of the image tube.

The potential pattern on the uncovered side of the photoconductive layer 10 of the composite photocathode 6 may also be used for modulating photoemission from a photoemissive layer closely spaced to said photoconductive layer. This embodiment of my invention is shown in Fig. 3. The photoemissive layer which may be of mosaic or of continuous type layer 26 is deposited in image tube 32 on a supporting conducting mesh screen 27. The photoemissive layer is irradiated by a strong uncontrolled source of light 28. The photoemission from layer 26 depends on potentials to which it is subject. The potential image on the surface of the layer 10 produced by X-ray or neutron image, because of its close proximity, exerts a powerful influence and can control, therefore, photoemission from said layer 26. The more negative the potential pattern on the layer 10, the more suppressed is the photoemission of electrons from layer 26. Therefore, photoelectron beam 26a emitted from layer 26 has the pattern corresponding to the potential pattern on the surface of layer 10. The photoelectron beam 26a, after being modulated by potentials of layer 10, is intensified by acceleration and electron-optical diminution produced by magnetic or electrostatic fields 28a. Next it is projected on the fluorescent screen 29 having light reflecting, electron transparent backing 30, such as of aluminum, to reproduce a visible image, as was explained above. The fluorescent image may be viewed through the optical system 31, which will magnify the fluorescent image to a desired size, without impairing its brightness.

Further improvement of operation of my X-ray or neutron sensitive image tube may be obtained by a better conversion of invisible radiation into electrons and positive holes in the photocathode. The previously described photocathode 6 had a serious deficiency, namely, the conversion of X-ray or neutron image into fluorescent image in layer 8 had only 3% quantum efficiency. By using photocathode of a material which responds directly to X-ray or neutron radiation with quantum efficiency of unity, a thirty-fold increase in sensitivity of my image tube was obtained. This embodiment of invention is shown in Fig. 4.

The X-ray or neutron sensitive image tube 35 has photocathode 36 consisting of X-ray or neutron transparent electrically conducting layer 37, such as of gold, silver or platinum and of a dielectric layer 38, which exhibits X-ray or neutron induced conductivity, such as of cadmium sulphide, either of non-luminescent type or of luminescent variety, diamond, sulphur, silver halides, antimony compounds, NaJ(Tl) and others. The electrical field across layer 38 is provided by the source of electrical power, such as battery 12, or a pulsating square wave voltage may be applied, as was explained above. One terminal of the battery is connected to layer 37, another terminal to the conducting coating inside of the image tube. An improvement in operation of electrical field across the layer 38 may be obtained by using as a second terminal for the battery 12, an additional mesh screen 34 in close spacing to layer 38, as shown in Fig. 1a. Also, the arrangement shown in Fig. 1b, where a discontinuous mosaic of conducting particles, such as of gold, platinum or silver, was applied as an electrode for the second terminal of battery, may be used for this purpose. The impingement of the X-ray or neutron beam on the layer 38 produces therein two different effects, a pattern of electrical conductivity changes within the layer and a pattern of potentials on its surface, both of which correspond to the original invisible image. By proper choice of X-ray or neutron sensitive material, these two effects may be made to work in the same direction and improve modulation of the irradiating electron beam. The rest of the operation of X-ray or neutron sensitive image tube 35 is the same as was described above for the tube 1 or 24. The photocathode 36 is irradiated by a broad beam of electrons 14 from the electron gun 13. The electron beam 14 is modulated by the pattern of conductivity and of potentials of the layer 38, which acts as an electron mirror 11a. The returning electron beam 19a carries, therefore, image information. On its return, it is intensified by acceleration and electron-optical diminution, as was explained above. Next, it is projected on the fluorescent screen 22a and reproduces thereby an invisible image corresponding to the original X-ray or neutron image.

It is obvious that photocathode 36 may also be used in the image tube 1, illustrated in Fig. 1, or in the image tube 32, illustrated in Fig. 3.

The response of photocathode 36 may be increased by irradiating X-ray sensitive layer 38, if it is of cadmium sulphide, with green light. Also addition of activators, such as Ag, increases sensitivity. Some cadmium sulphide crystals respond better to infra-red stimulation; some, on the contrary, lose their sensitivity when irradiated by infra-red light. If the X-ray sensitive layer is of diamond, the irradiation with infra-red light or with ultra-violet light will increase its sensitivity. Some X-ray or neutron sensitive materials have the best sensitivity when refrigerated. For example, silver chloride must be kept at the temperature of liquid air to be responsive to X-rays. Diamond performs well at room temperature; however, a marked increase of its sensitivity is observed when it is kept at the temperature of 200° K. Also, sensitivity of CdS increases markedly on cooling.

Some X-ray sensitive materials show a considerable lag, i. e. persistence of conductivity, after being irradiated by X-ray or neutron image. This lag effect may be used to operate image tube 36 as a storage tube. The conductivity lag means that conductivity pattern in the layer 38 and potential pattern on the uncovered surface of said layer 38 will persist for many seconds after the exciting X-ray or neutron radiation has been stopped. During all this time, the beam 14 will be modulated by said pattern and will continuously reproduce a visible fluorescent image corresponding to the original X-ray or neutron image in the fluorescent screen 22. I discovered that repeated irradiation with electron beam does not discharge conductivity or potential pattern stored in layer 38. Therefore, reproduced image can be read for a long time without maintaining X-ray or neutron radiation. This results in a large reduction of the total X-ray or neutron exposure affecting the patient.

Addition of suitable impurities, i. e. activators to the X-ray or neutron sensitive layer will markedly change its conductivity lag and time necessary to arrive at equilibrium. Also, changes of temperature have similar effects. In particular, the conductivity lag may be prolonged by refrigerating the layer 38 of the photocathode.

It is obvious that image tubes 1, 24, 32 or 35 described above, may also be adapted for television of X-ray or neutron images, as shown in Fig. 5. In this embodiment of my invention, the X-ray or neutron image impinges on photo-cathode 36 described above and produces in its layer 38 conductivity and potential pattern, as was explained above.

The broad electron beam 50 from the electron gun 53 is focused on the uncovered surface of the photocathode 36 and irradiates it as long as the conductivity and potential image is present in the photocathode. The electron beam 50 is decelerated in front of the photocathode by an additional decelerating electrode, which may be in the form of a ring or of a mesh screen. The electron beam 50 approaching the X-ray or neutron sensitive layer 38 is modulated by the pattern of potentials on its surface 11a and of conducting changes within said layer. The returning electron beam 51 is modulated by said image in the photocathode 36 and is focused and projected on the storage target 41 by the action of magnetic or electrostatic fields 52. The operation of electron beam 50 should be preferably in two stages, as was explained above. In the first period, the build-up of conductivity and potential image in layer 38 is accomplished. In the second period, said image is read by electron beam 50. The returning electron image 51 may be intensified by acceleration, which is accomplished by accelerating electrical fields 44 and which is well known in the art and, therefore, it is believed it does not have to be described in detail. Further intensification of this electron image 51 may be obtained by its electron-optical diminution, which results in intensification proportional to the square power of a linear decrease in size. The electron-optical system of demagnification is also well known in the art. The returning electron beam 51 strikes the storage target 41 with velocity sufficient to produce secondary electron emission from the target 41 higher than unity. The secondary electrons are collected by the adjacent mesh screen 42 and are led away. As a result, a positive charge pattern remains in the semi-conductive target 41. The target 41 may be of glass and must be very thin, such as from 5 to 100 microns. The positive charge image, because of thinness of target 41 can migrate to its opposite side in less than $\frac{1}{30}$ second. This time depends on resistivity of the target and may be selected as desired for purposes of invention. The electron gun 40 produces a fine electron beam 48 to scan the target 41. The electron beam 48 is slowed down in front of the target 41 by decelerating electrode 47, which may be in the form of a ring or mesh screen. The slow electron beam 48 is modulated by the pattern of positive electrical charges on the target 41. The returning electron beam 48a carries, therefore, image information, and is directed now to multipliers 49 and strikes the first stage 49a of multiplier. The secondary electrons produced by impingement of electron beam 48a are drawn to the next stage 49b of the multiplier 49, which is around and in the back of the first stage. This process is repeated in a few stages resulting in a marked multiplication of the original electron signals. The signal currents from the last stage of the multiplier are converted over a suitable resistor into video signals. Video signals are fed into the television amplifiers and then are sent by coaxial cable or by high frequency waves to the receivers of kinescope type or facsimile type, in which they are reconverted into visible images for inspection or recording. The focusing and deflecting fields 46 for electron beam 48, as well as accelerating fields 45 and synchronizing circuits are not shown as they are well known in the art and would only complicate drawings.

The X-ray or neutron sensitive television system can also be used advantageously with the storage effect described above. It will improve the signal to noise ratio of the system because once the invisible image is formed in the photocathode 36, it can be used for a long time for modulating the electron beam 50. As a result, a larger charge image can be built up in the storage target 41. Another advantage of the storage system is reduction of the total X-ray or neutron exposure, which was one of the primary objectives of the invention.

As various possible embodiments might be made of the above invention and as various changes might be made in the embodiments above set forth, it is to be understood that all matter herein set forth, as shown in the accompanying drawings is to be interpreted as illustrative and not in a limiting sense.

I claim:

1. A tube comprising in combination a composite photocathode for receiving an invisible radiation image and converting said image into an electrical conductivity pattern corresponding to said image, said photocathode comprising a fluorescent layer, a light transparent conducting layer and a photoconductive layer, means for producing a broad beam of electrons, said means being spaced apart from said photocathode to convert said conductivity pattern into a broad beam of electrons having the pattern of said image and a screen for receiving said broad electron beam having the pattern of said image.

2. A tube comprising in combination a composite photocathode for receiving an invisible radiation image and converting said image into an electrical conductivity pattern corresponding to said image, said photocathode comprising said invisible radiation transparent and light reflecting layer, a fluorescent layer, a light transparent conducting layer and a photoconductive layer, means for producing a broad beam of electrons, said means being spaced apart from said photocathode to convert said conductivity pattern into a broad beam of electrons having the pattern of said image, and a screen for receiving said broad electron beam having the pattern of said image.

3. In a device, as defined in claim 1, said photoconductive layer being of antimony trisulphide.

4. In a device, as defined in claim 1, said photoconductive layer being of selenium.

References Cited in the file of this patent
UNITED STATES PATENTS

| | | |
|---|---|---|
| 2,177,736 | Miller | Oct. 31, 1939 |
| 2,258,294 | Lubszynski et al. | Oct. 7, 1941 |
| 2,334,516 | Szegho | Nov. 16, 1943 |
| 2,532,339 | Schlesinger | Dec. 5, 1950 |
| 2,544,754 | Townes | Mar. 13, 1951 |
| 2,555,091 | Lubszynski | May 29, 1951 |
| 2,622,219 | Schagen | Dec. 16, 1952 |